United States Patent [19]

Jenny

[11] 3,977,631

[45] Aug. 31, 1976

[54] AIRCRAFT WHEEL DRIVE APPARATUS AND METHOD

[75] Inventor: Robert William Jenny, Bellevue, Wash.

[73] Assignee: The Boeing Company, Seattle, Wash.

[22] Filed: June 4, 1975

[21] Appl. No.: 583,598

[52] U.S. Cl. ............................... 244/50; 188/71.5; 244/111
[51] Int. Cl.² ....................................... B64C 25/42
[58] Field of Search ................. 244/50, 111, 103 R; 188/18 A, 71.5, 72.4; 180/49, 70 R; 192/1–3 R

[56] References Cited
UNITED STATES PATENTS
3,482,654  12/1969  Abu-Akeel ........................ 188/71.5

*Primary Examiner*—Duane A. Reger
*Assistant Examiner*—Barry L. Kelmachter
*Attorney, Agent, or Firm*—Christensen, O'Connor, Garrison & Havelka

[57] ABSTRACT

In order to drive the wheels of an aircraft with an auxiliary, ground handling drive, a wheel drive motor is selectively coupled to the aircraft wheel through a rotatably mounted aircraft brake assembly. The normally nonrotating stator portion of a conventional aircraft brake assembly is rotatably mounted about the wheel axle and is rotatably driven through a planetary gear system by the wheel drive motor. During ground handling, the brake assembly is actuated to cause a clutch-like engagement between the rotatably mounted brake stator elements and the conventional brake rotor elements, mounted on the aircraft wheel, to couple the motor to and for driving the wheel. Disengagement of the brake stator elements and wheel rotor elements decouples the motor drive and allows the aircraft wheel to freely rotate for the high rotational velocities occurring during take-off and landing. To utilize the brake assembly for its normal braking function, the rotatably mounted brake stator elements are locked against rotation by an auxiliary brake applied to a drive shaft coupling the motor to the planetary gear system.

7 Claims, 2 Drawing Figures

AIRCRAFT WHEEL DRIVE APPARATUS AND METHOD

BACKGROUND

The present invention pertains to systems for rotatably driving aircraft wheels for taxiing or other ground handling operations of an aircraft.

With the increasing size of aircraft, there is a need for powering aircraft wheels, so that the airplane can be self-propelled in an easily controlled ground drive mode without using the main aircraft propulsion engines for thrust. However, the technical problems encountered in providing such an auxiliary drive system for aircraft wheels are numerous. For example, the wheel drive system must not add excessive weight to the aircraft; it must not be so complex that it is unreliable and difficult to service; it must generate sufficient power and efficiently deliver such power to the wheels in order to propel hugh aircraft transports; provision must be made for disconnecting or decoupling the drive from the aircraft wheels for normal taxi, take-off and landing; and typically provision must be made for reduction gearing between the auxiliary wheel drive motors and the wheels.

Previous attempts have been made to provide an auxiliary motor drive for aircraft wheel assemblies, such as disclosed in U.S. Pat. No. 3,711,043 issued on Jan. 16, 1973 to Alan Cameron-Johnson. However, none of these prior art efforts have been found satisfactory. For example, in the above-mentioned U.S. Pat. No. 3,711,043, separate clutch and wheel brake assemblies are utilized for coupling the auxiliary motor to the wheel and braking the wheel respectively, resulting in a relatively complex mechanism and one which is subject to malfunction because of the substantial torque load which must be handled by the separate clutch for the auxiliary motor drive. Additionally, by utilizing a separate, independent clutch assembly for coupling the wheel drive motor to the wheel itself, it is generally necessary to mount the clutch assembly, and in some cases the drive motor in close proximity to the aircraft wheel assembly, resulting in a cramped system which limits the design flexibility of the components and makes servicing of the assemblies difficult.

OBJECT AND SUMMARY OF THE PREFERRED EMBODIMENT OF THE INVENTION

Accordingly, it is an object of the present invention to provide a wheel drive system for an aircraft to facilitate ground handling guidance and propulsion, which in its various embodiments provides a practical solution to one or more of the foregoing technical problems associated with such a drive system.

Briefly, the preferred embodiment of the invention as described herein provides for modifying a standard wheel brake assembly of an aircraft such that the stator portion thereof is rotatably mounted and driven in rotation by a wheel drive motor. By selectively energizing the brake assembly to cause engagement between the rotatably mounted and driven brake stator and the cooperating wheel mounted rotor components of the brake assembly, rotational drive is transmitted from the drive motor to the wheel for propelling the aircraft on the ground. In other words, the brake assembly is modified so as to serve the additional function of providing a controllable clutch for selectively coupling the wheel drive motor and the wheel.

In order to utilize the brake assembly for its usual purpose, that is to brake the ground speed of the aircraft during take-off, landing or taxiing, provision is made for restraining rotation of the rotatably mounted brake stator. As disclosed more fully herein, this may take the form of an auxiliary brake acting on the drive shaft linkage between the wheel drive motor and the rotatably mounted brake stator, locking the latter against rotation, so that the main brake is effective to slow the rotation of the aircraft wheel.

In order to accommodate different, selective gear reduction ratios between the output of the wheel drive motor and the rotatably driven brake stator, a planetary, reduction gear assembly is mounted between the stub axle and the rotatably mounted brake stator in a housing which extends substantially coaxially about the main axle. An input shaft from the wheel drive motor is received by the planetary gear assembly at an angle substantially perpendicular to the main axle to facilitate the mounting of the drive motor in a position away from the cramped wheel and brake assemblies, such as on the wheel assembly strut or truck beam. With the provision of reduction gearing between the wheel drive motor and the rotatably driven brake stator, the auxiliary brake, acting on the output of the wheel drive motor, may be utilized as a vernier brake for decelerating the aircraft wheel through the reduction gearing with the main brake fully engaged.

These and further features, objects and various advantages of the aircraft wheel drive apparatus in accordance with the present invention will become apparent to those skilled in the art from a consideration of the following detailed description and appended drawings of an exemplary embodiment thereof.

DESCRIPTION OF THE PREFERRED EMBODIMENT

Figure 1:
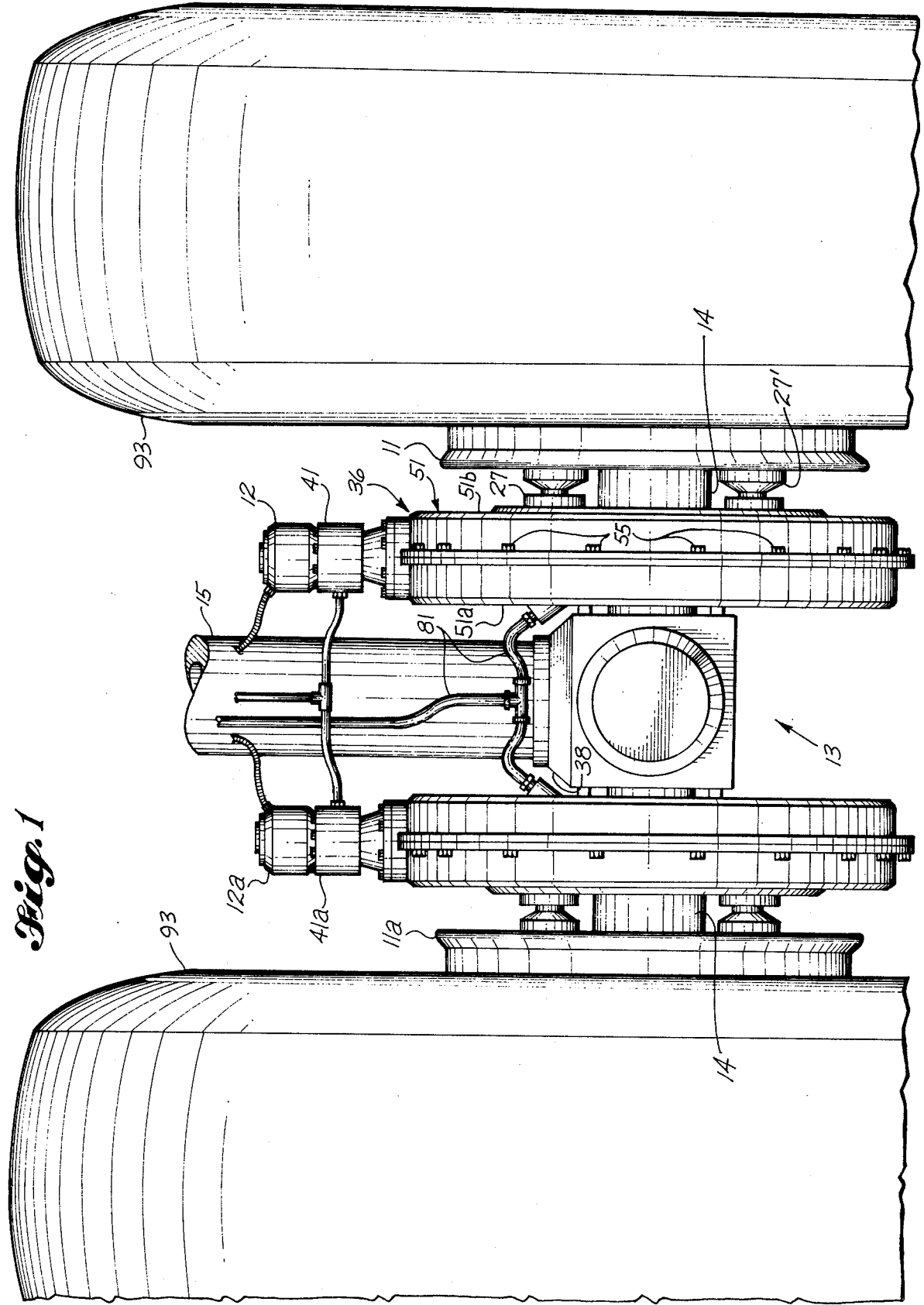
FIG. 1 is a front elevation view of an aircraft wheel drive apparatus constructed in accordance with one embodiment of the present invention illustrating the aircraft wheels, brake and drive assemblies mounted on a wheel truck carried by a landing gear strut.
Figure 2:
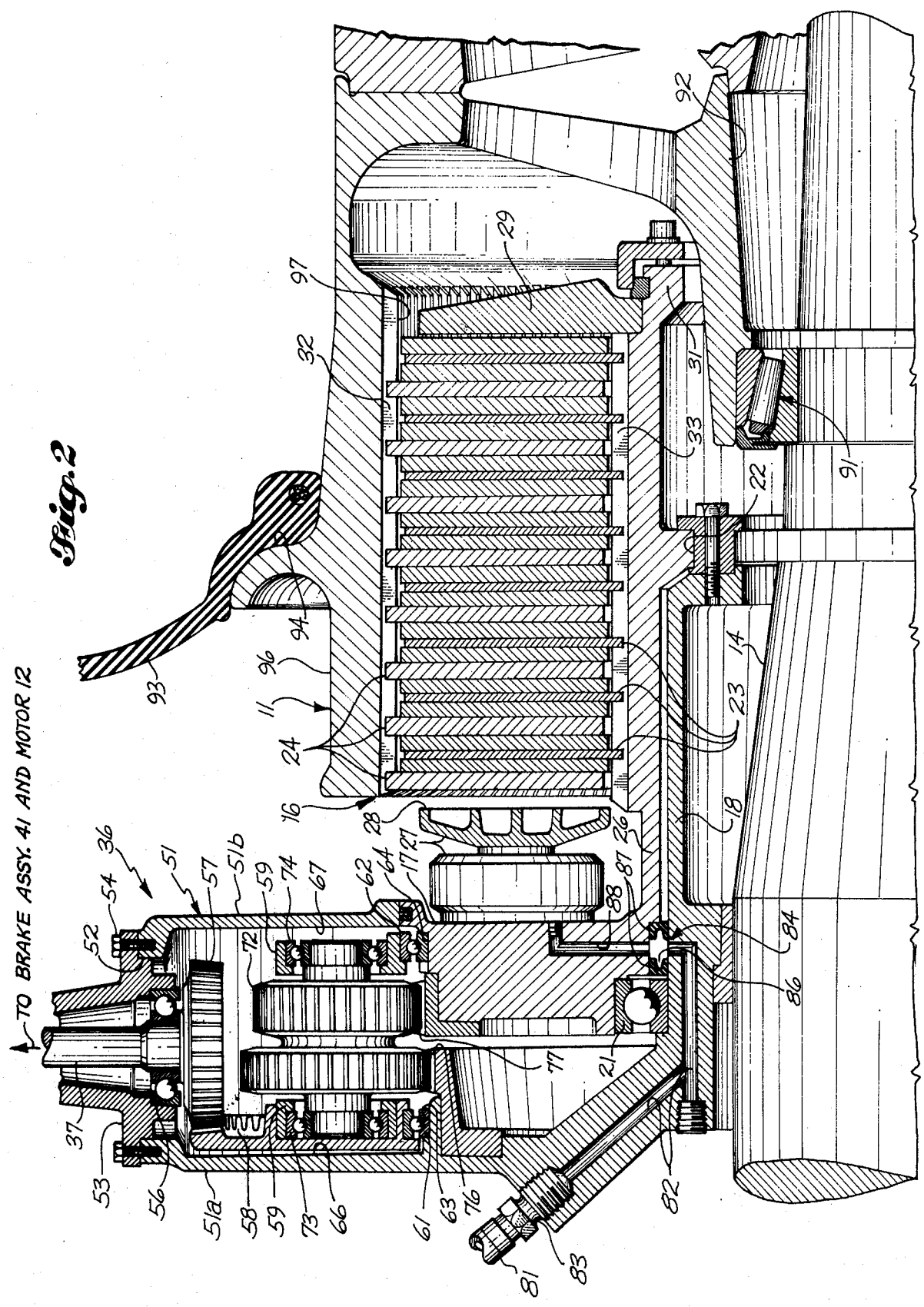
FIG. 2 is a partial axial sectional view of the drive and brake assembly associated with one of the wheels of FIG. 1.

With reference to FIGS. 1 and 2, the aircraft wheel drive apparatus in accordance with the herein disclosed preferred embodiment of the invention provides for driving one or more aircraft wheels 11 by means of a ground drive motor 12. In this instance wheel 11 and drive motor 12 are mounted on a multi-wheel truck 13 which mounts a plurality of wheels similar to wheel 11, each of which may be provided with an individual ground drive motor as illustrated by the additional wheel 11a and motor 12a mounted opposite wheel 11 on the main wheel axle 14 carried by truck 13.

In accordance with the present invention, the standard aircraft wheel brake assembly for braking wheels 11 and 11a is altered so as to serve the dual functions of selectively coupling ground drive motors 12 and 12a to wheels 11 and 11a respectively, and alternatively selectively braking the rotation of wheels 11 and 11a for deceleration of the aircraft during landing or other ground control operations. For this purpose, and as best illustrated in FIG. 2, the nominally stationary or nonrotating stator elements of the brake assembly 16 are mounted on a brake carrier means which is rotatably mounted about the same axle 14 which supports wheel 11.

More particularly, carrier member 17 is of an annular configuration coaxially mounted for rotation on a stub axle 18 by bearings 21 and 22, wherein the stub axle is in turn mounted on the main wheel axle 14 concentrically with wheel 11. Carrier member 17 of brake assembly 16 supports a plurality of stator brake elements 23 interleaved with a plurality of rotor brake elements 24 mounted for rotation with wheel 11. Stator elements 23 are carried by a torque tube 26 coaxial with axle 14 and wheel 11 and fixedly connected to carrier member 17, and in this instance being integral therewith. A hydraulic acutator 27 in this instance affixed to carrier member 17 is operable under hydraulic braking pressure to be forced outwardly away from carrier member 17 parallel to the axis of axle 14 to sandwich stator elements 23 and rotor elements 24 between an actuator face 28 and an abutment plate 29 carried by torque tube 26 adjacent an axial end 31 thereof spaced from actuator 27. Rotor elements 24 and stator elements 23 are splined to wheel 11 and torque tube 26 respectively by axially extending splines 32 and 33 to allow axial displacement of the interleaved elements in response to the application and removal of the braking force applied by actuator 27. One or more actuators, identical to actuator 27 may be circumferentially spaced about carrier member 17 as indicated by the pair of actuators 27 and 27' of FIG. 1 mounted at diametrically opposed locations with respect to axle 14.

Brake assembly 16 other than the fact that it is mounted on a rotatable, and as will be seen herein, drivable carrier member 17, stator elements 23, rotor elements 24, actuator 27 and plate 29 are all of conventional construction and insofar as pertains to the present invention, these components of brake assembly 16 may be constructed in accordance with any of a wide variety of known aircraft and vehicle brake assemblies whether they be of the stacked, multi-element interleaved disc-type assembly as illustrated here, or a single-element disc-type, drum-type, etc. For larger aircraft, the stacked, multiple-element brake configuration is usually employed because of the greater braking torque capabilities of this type of mechanism.

Accordingly, brake assembly 16 provides first braking element means in the form of stator elements 23 which are nonrotatably mounted to a carrier means here provided by annular, rotatably mounted member 17. Cooperating with the first braking element means is a second braking element means here provided by rotor elements 24 which are nonrotatably mounted on wheel 11 in proximity to the first braking element means for responding to an acutator means, provided by actuator 27. The actuator means effects relative movement of the stator and rotor elements between a disengaged, free-wheeling condition of wheel 11 with respect to carrier member 17 and axle 14 and an engaged condition restraining relative rotation between wheel 11 and carrier member 17.

To utilize the dual function brake assembly 16 in its capacity as a device for coupling ground drive motor to and for rotating wheel 11, carrier member 17 is rotatably driven about axle 14 while actuator 27 is operated to cause the braking elements to assume their engaged condition locking the rotation of member 17 to that of wheel 11. In this condition, the carrier means provided by member 17 is rotatably driven by drive means including motor 12 which is here coupled to and for rotating member 17 through a gear train assembly 36. With ground drive motor 12 coupled in this manner to and for rotating carrier member 17, and above mentioned first braking elements, here provided by stator element 23, are rotatably driven by motor 12 via assembly 36, member 17, torque tube 26 and splines 33. Since elements 23 are engaged with the wheel braking elements 24, the wheel is rotated with the braking element functioning as an engaged clutch having a torque drive capability commensurate with that of the braking torque capacity of braking assembly 16.

Although the brake carrier means provided by carrier member 17 may be coupled to the drive motor or other drive means by any number of suitable gear configurations, or other coupling systems or devices, in this particular embodiment gear train assembly 36 is of a planetary gear configuration having an input motor drive shaft 37 extending at right angles to the axis of the main wheel axle 14. With this configuration, the drive motor may be disposed in a location away from the relatively cramped space immediately adjacent the wheel and brake assemblies as indicated by the mounting of motors 12 and 12a adjacent strut 15 of the aircraft landing gear. Indeed, any number of suitable locations may be used for mounting the drive motor, such as on the truck beam 38, on strut 15, or in the wheel well which houses the retracted landing gear in which case telescopic or flexible drive shafting may be used to couple the drive motor or motors to the gear train assembly 36. Furthermore, although separate motors 12 and 12a are utilized in the present embodiment for driving each of wheels 11 and 11a, a single motor drive with appropriate split coupling or gear drive assemblies may be employed to drive the wheels from a common drive source.

Inasmuch as brake assembly 16 is rotatably mounted by carrier member 17 on stub axle 18 an main axle 14, means must be provided for restraining carrier 17 against rotation with respect to axle 14 when the brake is functioning in its normal capacity to decelerate the rotation of wheel 11, such as during landing of the aircraft. In this particular embodiment, the means for restraining rotation of carrier member 17 is provided by an auxiliary controllable brake assembly 41, and a corresponding like assembly 41a, for selectively braking or restraining the rotation of the drive shaft, namely shaft 37, coupling the drive motors to the gear train assembly 36. Although auxiliary brake assemblies 41 and 41a are here provided in the form of a hydraulically actuated friction brake, it is contemplated that other types of controlled or selectively actuated restraining means may be employed such as a "no-back" unit, to selectively provide a condition of restraint against relative rotation of carrier member 17 during which brake assembly 16 is effective to apply braking torque to wheel 11, and a condition of nonrestraint permitting motor 12 to rotatably drive carrier member 17 through shaft 37 and gear assembly 36.

Additionally, by utilizing a reduction gearing ratio in assembly 36 between carrier member 17 and motor drive shaft 37, the brake assembly 41 may be operated as a vernier brake for precision, ground handing control. In such case, the main brake assembly 16 is actuated to an engaged condition and brake assembly 41 is operated between its conditions of nonrestraint and full restraint to apply a braking torque through the reduction gearing of assembly 36 to carrier member 17 and thus to wheel 11.

Assembly 36 is here provided by a planetary gear assembly coaxially mounted about axle 17 on the inboard side of wheel 11 adjacent truck beam 38. Assembly 36 includes an annular, internally hollow housing 51 extending radially outwardly from stub axle 18. For assembly purposes, housing 51 may be formed of split-half housing sections 51a and 51b, with section 51a being integral with or otherwise connected to stub axle 18 and section 51b being detachably fastened to section 51a by suitable bolt fasteners 55 as shown in FIG. 1.

Drive shaft 37 from motor 12 extends through auxiliary brake assembly 41 radially into housing 51 through an opening 52 which matingly receives a bearing sleeve 53 fastened to a perimeter of opening 52 by suitable fastening means such as bolts 54. Sleeve 53 internally supports a bearing 56 for an end of shaft 37 to which a pinion gear 57 is fixedly attached for rotation with shaft 37 inside hollow annular housing 51.

Pinion gear 57 meshes with a bevel gear 58 which is coaxially disposed with respect to the axis of main axle 14 and is affixed to and for rotation with an annular planet gear carrier assembly 59 rotating on bearings 61 and 62. Bearing 61 is mounted on a bearing seat 63 of housing 51 and extends coaxially with respect to axle 14, while bearing 62 is mounted on a bearing seat 64 provided by an exterior cylindrically surface portion of carrier member 17. Bearings 61 and 62 are axially spaced with respect to axle 14 and are mounted adjacent the opposed inside radial walls 66 and 67 of housing sections 51a and 51b, respectively.

Planet gear carrier assembly 59 carries a plurality of planet gear clusters, one of which is shown as cluster 68 and wherein each cluster includes a pair of jointly rotating pinion gears 71 and 72 having unequal numbers of teeth to provide a predetermined gear ratio drive as discussed hereinafter. Each of these planet gear clusters such as cluster 68 is rotatably mounted in bearings supported by carrier 59 such as planet gear bearings 73 and 74.

Pinion gear 71 meshes with a sun gear 76 fixedly mounted in housing 51 and extending coaxially with respect to main axle 14. Pinion gear 72 which is axially spaced from pinion 71 meshes with a driven gear 77 fixedly attached to an outer circumferential portion of brake carrier member 17 which in turn is rotatably mounted on bearings 21 and 22 as discussed above.

Accordingly, as shaft 37 drives pinion gear 57 in response to motor 12, bevel gear 58 is rotated to cause rotation of carrier 59 about sun gear 76. As carrier 59 is thus rotated, planet gear 71 of cluster 68 is caused to rotate by reason of the relative rotation between the planet gear carrier and the stationary nonrotatably mounted sun gear 76. Planet gear 72 is thus rotated about the axis of cluster 68 at the same rate of angular rotation as planet gear 71.

Because of the different pitch diameters of planet gears 71 and 72, gear 72 causes a differential rotation of driven gear 77 with respect to the stationary sun gear 76, thus resulting in the application of a rotatable drive to the brake carrier member 17 in response to rotation of motor drive shaft 37. A substantially reduced drive ratio may be provided to enable the application of substantial drive torque to the aircraft wheel 11 via the engaged brake assembly 16.

With brake carrier member 17 and the nominally stationary stator components of brake assembly 16 rotating on bearings 21 and 22 with respect to stub axle 18, provision is made for coupling the control lines for operating actuators 27 across the interface of the relatively rotating parts. In the presently illustrated embodiment, the actuators for the brake assembly are hydraulically operated over brake fluid conducting means including brake fluid line 81 which is coupled to a fluid passage of a stationary housing 51 wherein passage 82 extends to an interface 84 between the relatively rotating carrier member 17 and stub axle 18. At interface 84, the fluid passage 82 is coupled to a circumferentially extending fluid gland 86 formed by annular elastomer seals 87. Both passage 82 of the stationary housing 51 and a brake fluid passage 88 provided in carrier member 17 communicate with gland 86. Passage 88 extends from gland 86 to and for operating actuator 27. In this manner the circumferentially extending gland 86 may be pressurized by pressurizing the inlet passage 82 from line 81, wherein this increase in hydraulic pressure is communicated to passage 88 and hence to actuator 27 for operating the braking elements. A number of radially extending manifold passageways, similar to passage 88, may be provided in member 17 for feeding each of the plurality of brake actuators 27 and 27'.

Wheel 11 is rotatably mounted on axle 14 by bearing 91 and another bearing (not shown) adjacent the outboard portion of the wheel hub 92. A tire 93 is fitted to tire rim 94 at the outer circumference of a hollow, cylindrical-like body 96 of hub 92. The internal region defined by body 96 of hub 92 accommodates the stacked multi-element components of brake assembly 16 with rotor element splines 32 being provided on an interior circumferential wall 97.

While only a limited number of embodiments of the present invention have been disclosed herein, it will be readily apparent to persons skilled in the art that numerous changes and modifications may be made thereto without departing from the spirit of the invention. Accordingly, the foregoing disclosure and description are for illustrative purposes only and do not in any way limit the invention which is defined only by the following claims.

I claim:

1. In an apparatus including an aircraft wheel axle, an aircraft wheel rotatably mounted on said axle, and a brake assembly having first and second braking element means and actuator means therefor, the combination therewith comprising:

rotatably drivable brake carrier means rotatably mounted on said axle concentrically with said wheel, said first braking element means being mounted on said carrier means and said second braking element means being mounted on said wheel and said first and second braking element means being relatively movable by said actuator means between a condition of disengagement therebetween allowing relative rotation between said wheel and carrier means, and a condition of engagement therebetween restraining relative rotation between said wheel and carrier means;

drive means coupled to said brake carrier means and having selective drive and nondrive conditions, said drive means being operable in its drive condition to rotate said carrier means; and controllable means coupled to said carrier means and having a restraint condition restraining relative rotation of said carrier means with respect to said axle and a nonrestraint condition in which said carrier means is free to be rotatably driven by said drive means in its drive condition.

2. In the apparatus set forth in claim 1, said drive means including a motor means and reduction gear means, said reduction gear means coupling said motor means to said carrier means.

3. In the apparatus of claim 1, wherein said controllable means comprises:
auxiliary brake means connected to said drive means for selectively restraining rotation of said carrier means by controlled braking of said drive means, thereby providing said restraint and nonrestraint conditions.

4. In the apparatus of claim 1, said actuator means including hydraulic means for effecting relative movement of said first and second braking element means between said conditions of engagement and disengagement, said actuator means being mounted on said brake carrier means for rotation therewith relative to said wheel axle, brake fluid conducting means mounted on said axle adjacent an interface with said rotatably mounted brake carrier means, and fluid coupling means for coupling said brake fluid across said interface between said fluid conducting means and said actuator means carried by said rotatably mounted brake carrier means.

5. In the apparatus of claim 1, said drive means including a planetary gear drive assembly having an input shaft adapted to be rotatably driven, first bevel gear means fixed to said shaft for rotation therewith, second bevel gear means mounted for rotation coaxially with respect to said wheel axle, planet gear carrier means attached to and for rotation with said second bevel gear means coaxially with said axle, planet gear cluster means rotatably mounted on said planet gear carrier means and including at least one gear cluster having first and second axially spaced planet gears, a sun gear means coaxially, nonrotatably mounted with respect to said axle coacting with said first planet gear of said cluster means, and a driven gear means carried by said brake carrier means coaxially with respect to said axle and coacting with said second planet gear, said first planet gear and coacting sun gear means having a different gear ratio with respect to said second planet gear and coacting driven gear, whereby rotation of said input shaft produces rotation of said brake carrier means.

6. An aircraft wheel drive apparatus comprising the combination of:
a wheel axle;
an aircraft wheel rotatably mounted on said axle;
controllable brake means having rotor means and stator means selectively engagable with said rotor means, said rotor means mounted on said wheel for rotation therewith;
means for rotatably mounting said stator means of said controllable brake means concentrically with respect to said aircraft wheel for selective engagement with said wheel mounted rotor means; and
means for selectively alternatively rotatably driving and restraining rotation of said means for rotatably mounting said stator means of said brake means.

7. A method of rotatably driving an aircraft wheel mounted for rotation on an axle and coacting with a controllable brake also mounted on said axle, comprising the steps of:
rotatably mounting said brake on said axle for concentric rotation with said wheel;
selectively alternatively rotatably driving and restraining rotation of said rotatably mounted brake; and
selectively operating said brake between actuated and unactuated conditions to allow unrestrained rotation of said wheel while in said unactuated condition and to effectively alternatively drive and brake said wheel while in said actuated condition in response to said alternative selective steps of driving and restraining said rotatably mounted brake, respectively.

* * * * *